United States Patent
Pollack et al.

(10) Patent No.: US 6,393,515 B1
(45) Date of Patent: *May 21, 2002

(54) MULTI-STREAM ASSOCIATIVE MEMORY ARCHITECTURE FOR COMPUTER TELEPHONY

(75) Inventors: Jonathan D. Pollack, Portland, ME (US); Charles C. Linton, Southboro, MA (US)

(73) Assignee: NMS Communications Corporation, Framingham, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/478,253

(22) Filed: Jan. 6, 2000

Related U.S. Application Data

(63) Continuation of application No. 08/931,710, filed on Sep. 16, 1997, now Pat. No. 6,034,965.

(51) Int. Cl.[7] .................................................. H04J 1/14
(52) U.S. Cl. .................... 711/108; 711/101; 711/202; 711/207; 370/321; 370/322; 370/337; 370/347; 370/382; 370/442
(58) Field of Search ................................. 370/401, 442, 370/347, 337, 352, 321, 322, 382, 400; 711/101, 202, 207, 108

(56) References Cited

U.S. PATENT DOCUMENTS

| | | | | |
|---|---|---|---|---|
| 4,382,295 A | * | 5/1983 | Moffitt et al. | 370/260 |
| 5,649,149 A | * | 7/1997 | Stormon et al. | 711/108 |
| 5,659,697 A | * | 8/1997 | Dietz | 711/207 |
| 5,812,550 A | * | 9/1998 | Sohn et al. | 370/395 |
| 5,841,874 A | * | 11/1998 | Kempke et al. | 380/50 |
| 5,860,085 A | * | 1/1999 | Stormon et al. | 711/108 |
| 6,034,965 A | * | 3/2000 | Pollack et al. | 370/442 |
| 6,097,721 A | * | 8/2000 | Goody | 370/379 |

OTHER PUBLICATIONS

*Research Report/Patent Assignment/Reassignment;Sep. 8, 1997.
*Research Report/Patent Family/Legal Status;Sep. 8, 1997.
*Music Semiconductors/1996 Technical Products Summary, Product Line Overview, Apr. 19, 1996 Rev. 3.
*Music Semiconductor/MU9C 1480 LanCam®, Data Sheet, May 17, 1995 Rev. 4.
*Music Semiconductors/MU9C1240 FastCAM™, Data Sheet, Nov. 18, 1994 Rev. 1.
*Music Semiconductor/MU9C5480 LANCAM®, Preliminary Specification, Jul. 22, 1994 Rev. 0.
*Music Semiconductors/MU9C1485 WidePort LAN-CAM®, Preliminary Data Sheet, Dec. 20, 1995 Rev. 1.
*Music Semiconductors/MU9C1640 CacheCAM™, Data Sheet, Oct. 21, 1994 Rev. 1.
*Musci Semiconductors/Associative Processing MU9C1640 CacheCAM™, Guidebook, Jul. 1994, Rev. 1.
*Music Semiconductors/Application Brief AB—N2, Aging a Station List with a Time Stamp, Jun. 11, 1993 Rev. 1.

* cited by examiner

*Primary Examiner*—Than Nguyen
(74) *Attorney, Agent, or Firm*—Mintz, Levin, Cohn, Ferris, Glovsky and Popeo, P.C.

(57) ABSTRACT

Aspects of the present invention are directed to communications circuits and method that utilize associative memories for providing telephony switching of data between different time slots in one or more time division multiplexed (TDM) serial data lines or streams. The communications circuit may include a first content-addressable memory block and a second content-addressable memory block each of which receive the same address for independently generating tags for accessing a data memory to provide data to or receive data from TDM data lines.

14 Claims, 3 Drawing Sheets

MULTI-STREAM ASSOCIATIVE MEMORY ARCHITECTURE FOR COMPUTER TELEPHONY

CROSS REFERENCE TO RELATED APPLICATION

This application is a Continuation of application Ser. No. 08/931,710, filed Sep. 16, 1997, now U.S. Pat. No. 6,034,965.

FIELD OF THE INVENTION

The invention relates to a communications circuit including a multi-stream associative memory architecture usable in high-speed computer telephony applications.

BACKGROUND OF THE INVENTION

Computer telephony is based on digital communication across time division multiplexed serial data lines, known as "streams." A typical computer telephony bus provides 16 or more streams, which each have between 32 and 128 time slots. A computer telephony switch creates connections between two time slots in two streams by moving data from an input time slot to an output time slot.

It is known to use a Content Addressable Memory (CAM) to manage connections in telephony switches. As the number of streams and time slots increases, however, the access time of the CAM needs to decrease in order for the CAM to be able to switch these signals. For example, in larger systems of 32 streams with 128 time slots each, a switch must compare the address field and access the data in a total of 30.5 nanoseconds, which is a relatively short time given today's technology.

SUMMARY OF THE INVENTION

In one general aspect, the invention features a communications circuit that includes a first content-addressable memory block that has an address input, a plurality of physical locations each of which comprises an address field responsive to the address input and an output field, and an output responsive to the output fields. The circuit also has a second content-addressable memory block that has an address input, a plurality of physical locations each of which comprises an address field responsive to the address input and an output field, and an output responsive to the output fields. The circuit also includes a data memory having an address input responsive to the output of the first content-addressable memory block and to the output of the second content-addressable memory block.

In preferred embodiments, a first pipeline memory block is operatively connected between the output of the first content-addressable memory block and the address input of the data memory, and a second pipeline memory block is operatively connected between the output of the second content-addressable memory block and the address input of the data memory. The circuit can also include a second data memory having an address input responsive to the output of the first content-addressable memory block, and the second data memory can be unresponsive to the output of the second content-addressable memory block. The content-addressable memory blocks can have slower access times than do the data memories. A counter can have an output operatively connected to the address inputs of the first and second content-addressable memory blocks. The circuit can further include time division multiplexed communications interface circuitry operatively connected to the content-addressable memory blocks for switching time division multiplexed time slot data from a first plurality of data streams onto a second plurality of data streams using the content-addressable memory blocks. The time division multiplexed communications interface circuitry can be operable to access the first content-addressable memory block to service connections with a first stream and to access the second content-addressable memory block to service connections with a second stream. The time division multiplexed communications interface circuitry can be operable to simultaneously access the first and second content-addressable memory blocks to simultaneously service connections with first and second streams.

In another general aspect, the invention features a communications circuit that includes means for providing a first address to a first address input of a first content-addressable memory block, means for retrieving a first tag corresponding to the first address, and means for accessing a first data item in a first data memory at a first location pointed to by the first tag. The circuit also includes means for providing a second address to a second address input of a second content-addressable memory block, means for retrieving a second tag corresponding to the second address, and means for accessing a second data item in the first data memory at a second location pointed to by the second tag.

In preferred embodiments, the circuit includes means for pipelining the first and second tags. The means for providing, retrieving, and accessing can be part of means for switching time division multiplexed communications data streams. The means for providing a first address can be for providing to the first content-addressable memory block data from a first of the streams, and the means for providing a second address can be for providing to the second content-addressable memory block data from a second of the streams. The means for providing a first address and the means for providing a second address can be for respectively simultaneously providing data from a first of the streams to the first content-addressable memory block, and data from a second of the streams to the second content-addressable memory block.

In another general aspect, the invention features simultaneously providing a first address to a first address input of a first content-addressable memory block and providing a second address to a second address input of a second content-addressable memory block, retrieving a first tag corresponding to the first address in response to the step of providing a first address, retrieving a second tag corresponding to the second address in response to the step of providing a second address, accessing a first data item in a data memory at a first location pointed to by the first tag, and accessing a second data item in the data memory at a second location pointed to by the second tag.

In preferred embodiments, the first and second tags are pipelined. The steps of providing, retrieving, and accessing can be performed as part of a step of switching time division multiplexed communications data streams. The method can also include further sets of steps of providing, retrieving and accessing, and the sets of steps of providing and retrieving can be applied to the first content-addressable memory block for a first of the streams and to the second content-addressable memory block for a second of the streams. The steps of providing can simultaneously provide the first address from a first stream to the first content-addressable memory block and the second address from a second stream to the second content-addressable memory block.

Systems according to the invention can be advantageous because they may not be limited by the number of streams, the number of time slots, by technology, and/or may be scalable for larger or smaller computer telephony systems applications. Aspects of the invention also allow for hard-wired access restrictions.

BRIEF DESCRIPTION OF AN ILLUSTRATIVE EMBODIMENT

Figure 1:
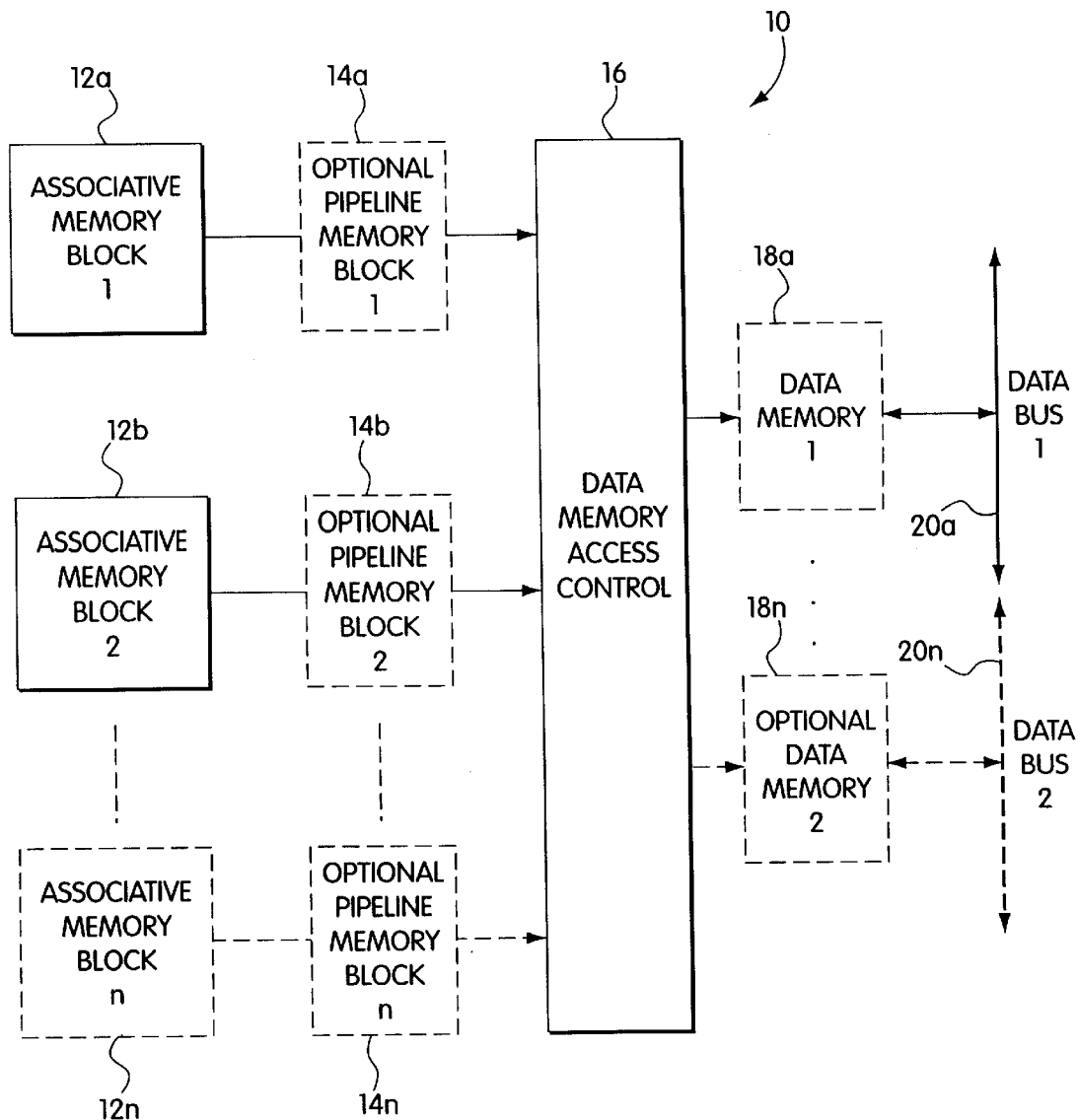
FIG. 1 is a block diagram of a multi-stream associative memory circuit according to the invention.

Referring to FIG. 1, an associative memory 10 according to the invention can include two or more associative memory blocks 12a, 12b, . . . 12n. Each of these associative memory blocks has an output provided to a data memory access control circuit 16, via one of a series of optional pipeline memory blocks 14a, 14b, . . . 14n. The data memory access control circuit has an output provided to one or more data memories 18a, . . . 18n. Each of these data memories has a data output operatively connected to a corresponding data bus 20a, . . . 20n.

Figure 2:
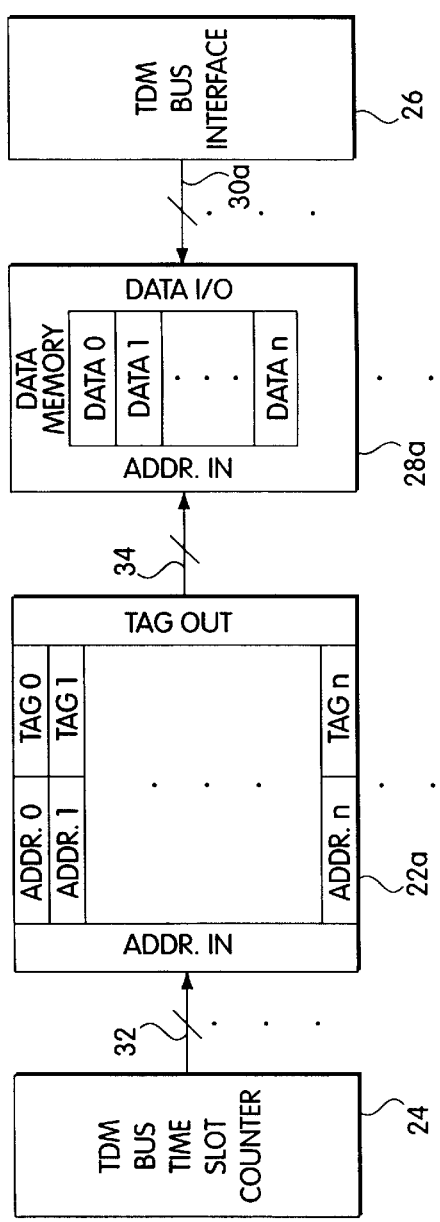
FIG. 2 is a block diagram illustrating use of a CAM to operate a digital telephony switch according to the invention.

Referring to FIG. 2, one type of CAM-based digital switch can be used to switch data streams from incoming time slots on one or more time division multiplexed (TDM) buses to outgoing time slots. This type of circuitry can include a TDM bus time slot counter 24, a series of cache blocks (e.g. 22a), a data memory (e.g., 28a—typically a RAM), and a TDM bus interface 26.

The TDM bus time slot counter 24 is a counter that is synchronized with the TDM bus. It has one or more parallel count outputs, which it provides to a respective input 32 of two or more of the CAM blocks. The bus streams are divided between the associative memories, so that each associative memory can monitor a subset of the total stream and time slot addresses. The associated memories are programmed to contain a number of addresses, which lie within the region of its particular sub-set. In this manner, data from timeslots on different streams can be processed at the same time. Note that the data memory access control circuit 16 can arbitrate the accesses if simultaneous hits occur in different CAM blocks. If the data memory is faster than the CAM blocks, however, the data memory access control circuit may only need to sequence the accesses.

Each CAM block (e.g., 22a) has an address input 32, a series of address locations addr0, addr1, . . . addrn, and a series of tag locations tag0, tag1, . . . tagn, corresponding respectively to the address locations. The CAM blocks each include content-addressable retrieval logic, which compares an address received on the address input to all of the address locations in the CAM, finds the location that matches the address, and supplies the contents of the corresponding tag location on a tag output 34.

The tag output 34 of each CAM block is provided to an address input of one of the random access memories (e.g., 28a). As is conventional, the data memory includes a series of storage locations data1, data2, . . . datan, which are addressed by addressing logic responsive to the address input. As is also conventional, the random access memory has a data I/O port that is operably connected to the location pointed to by the address on its address input. The data I/O port is operatively connected to a data bus (e.g., 30a), which is connected to the TDM bus interface 26, which is in turn operatively connected to the TDM bus.

Figure 4:
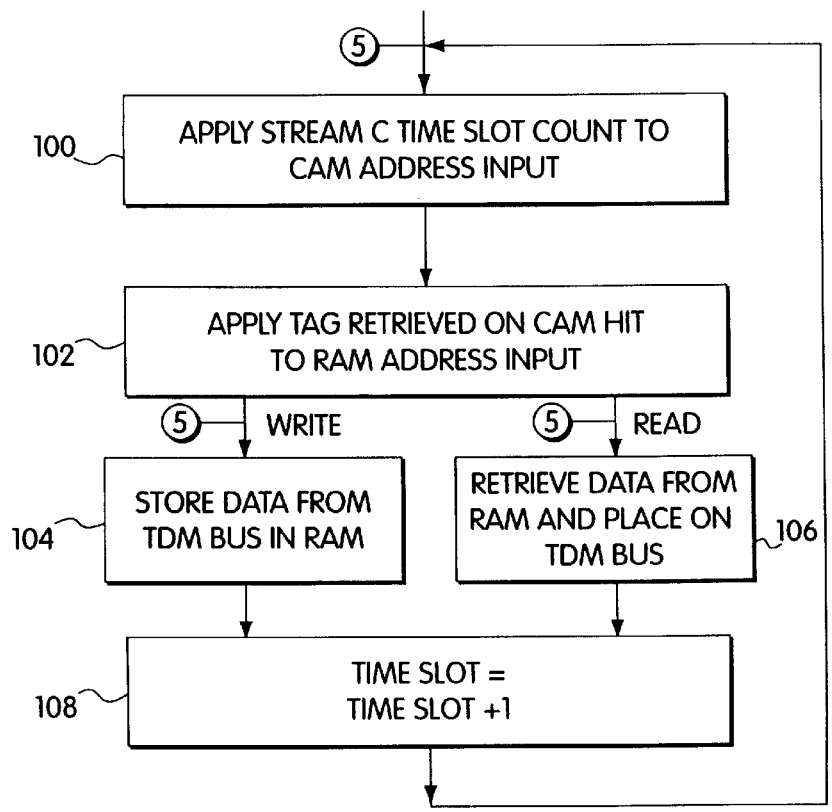
FIG. 4 is a flow chart illustrating the operation of the embodiment of FIG. 2.

In operation, referring to FIGS. 2 and 4, the TDM bus time slot counter 24 provides a current time slot count on its output to two or more of the CAM blocks (e.g., 22a) (step 100). Note that only some of the counter bits may be provided to the CAM blocks. This allows different streams to be processed in different CAM blocks. For example, in a two-block system, the counter can supply all but the most significant bit (NSB) of the address, and one CAM can search for addresses with an MSB of one and the other can search for addresses with an MSB of zero.

Each CAM block accessed searches its address locations addr0, addr1, . . . addrn to find an address that includes the count value. If there is a hit, the tag corresponding to the location that contains the current count is provided to the address input of the data memory (step 102). Multiple hits can be arbitrated, or they can be handled directly if the data memory is faster than the CAM blocks. In the case of a write, data from the TDM bus corresponding to the current time slot is written into the location in the data memory pointed to by the tag via the data bus (e.g., 30a) connected to that data memory. In the case of a read, the data memory places the data pointed to by the tag onto the data bus to be provided to the TDM bus by the TDM bus interface. The process then begins with the next time slot (step 108).

A "connection" is made when data is copied from one stream and time slot address to the data memory and then copied back from that same memory location to a different stream and time slot address. This includes two matches in the associative memories, one for a bus read and one for a bus write. Both associative memories may be used for this connection or both matches may reside in only one of the associative memories.

Figure 3:
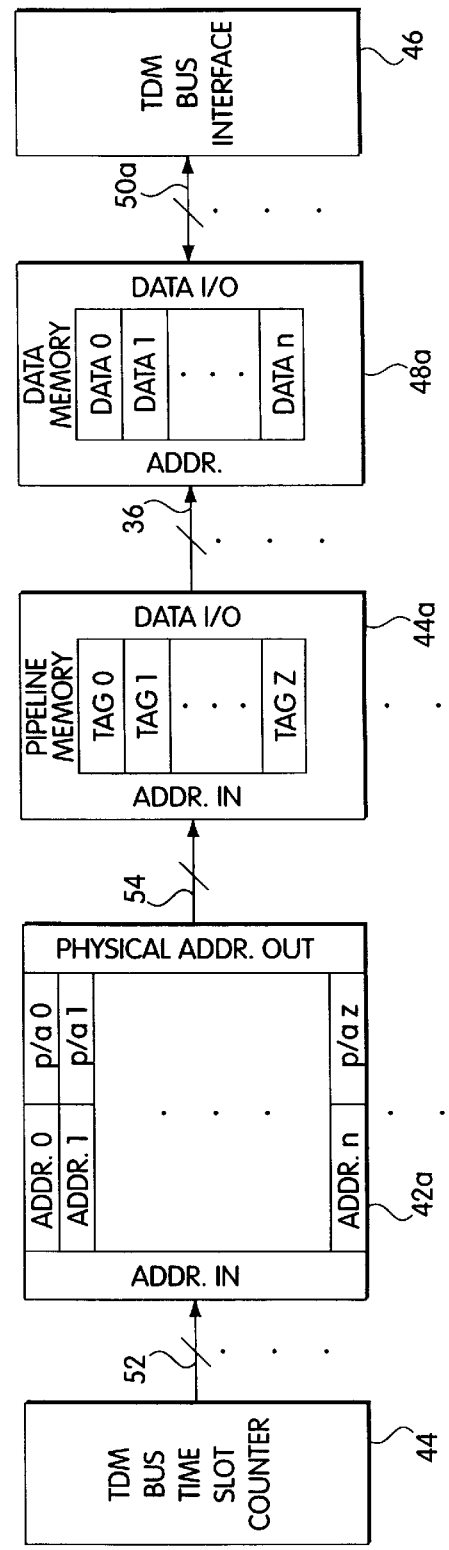
FIG. 3 is a block diagram illustrating the use of a CAM with a pipeline stage to operate a digital telephony switch according to the invention.

Referring to FIG. 3, a second type of CAM-based digital switch employs a pipelined approach. Such systems also include a TDM counter 44 and two or more CAM blocks (e.g., 42a). The CAM blocks store physical addresses instead of tags, however, and these physical addresses are provided on a physical address output 54 to an address input of a pipeline memory (typically a RAM—e.g., 44a). The pipeline memory stores a series of tags in its locations, and it has a data output provided to an address input of a data memory (e.g., 48a). The data memory has a data I/O port operably connected to a data bus (e.g., 50a), which is in turn operably connected to a TDM bus interface 46.

Figure 5:
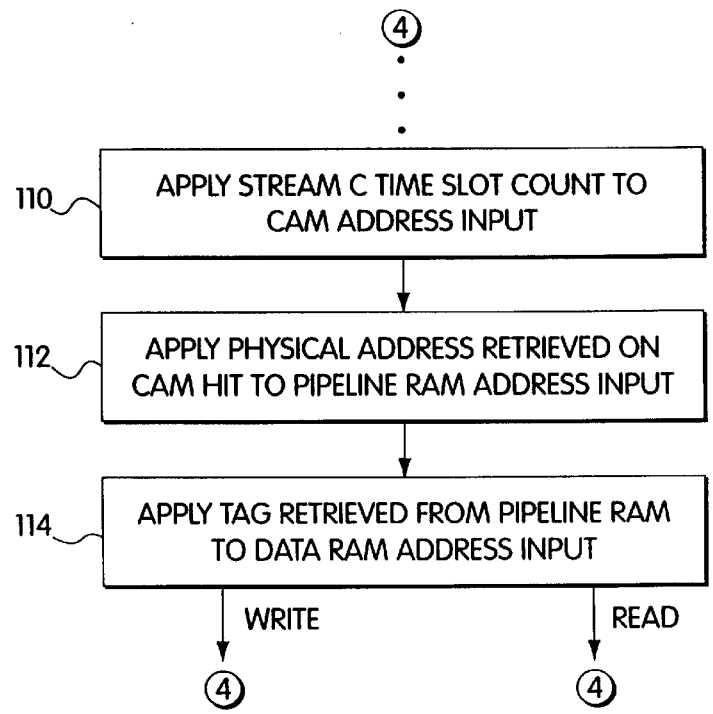
FIG. 5 is an alternate set of steps for the flow chart of FIG. 4 to be inserted between the points marked by circled "5s" and illustrating the operation of the embodiment of FIG. 3.

In operation, referring to FIGS. 3 and 5, pipelined switches differ in operation from non-pipelined switches because they perform an intermediate pipeline access. After applying the time slot count to the CAM address input (step 110), the CAM applies the physical address it retrieved to the pipeline memory address input (step 112). The pipeline memory then applies the tag retrieved to the data memory address input (step 114). The corresponding data memory location can then be accessed to read or write TDM time slot data. This pipelined approach is advantageous in that it permits the CAM to be matching the current stream and time slot address inputs while the pipeline memory is processing the tag input from the previous stream and time slot address.

It is also possible to provide an architecture that employs two or more separate data memories 18a, 18b, ... 18n. This allows a TDM bus to be split into two or more sub-busses, and to restrict information from one or more of the CAM blocks from one or more of the busses. For example, the CAM blocks can be configured so that one CAM can access one data memory, and the other can access two or more data memories. This allows for limited access.

Alternatively, there can be two data memories that can talk to both buses, but for which the access directions are confined. One memory can be used for flow from a first bus to a second bus, and the other can be used for flow from a second bus to a first bus. The CAM blocks can each access both data memories, but can only access a particular data memory for one transfer direction. This can further reduce bottlenecks if the system constraints prevent a single data memory from handling all of the requests from the CAM blocks in a given time period, by allowing a designer to arrange the architecture so that reads and writes are distributed across two data memories.

The present invention has now been described in connection with a number of specific embodiments thereof. However, numerous modifications which are contemplated as falling within the scope of the present invention should now be apparent to those skilled in the art. Therefore, it is intended that the scope of the present invention be limited only by the scope of the claims appended hereto. In addition, the order of presentation of the claims should not be construed to limit the scope of any particular term in the claims.

What is claimed is:

1. A communications circuit coupled to at least one time division multiplexed bus carrying a plurality of data streams of time division multiplexed time slot data, the communications circuit comprising:

a plurality of content addressable memory blocks coupled to respective portions of the plurality of data streams of the time division multiplexed bus and configured to associate indicia of data storage locations with time slots of the respective streams; and time division multiplexed communications interface circuitry coupled to the plurality of content addressable memory blocks and configured to switch time division multiplexed time slot data from a first of the data streams to a second of the data streams using the content addressable memory blocks.

2. The communications circuit of claim 1 wherein the first data stream is different from the second data stream.

3. The communications circuit of claim 1 wherein each of the plurality of content addressable memory blocks is coupled to at least one data memory configured to store data from, and supply data to, the time division multiplexed bus.

4. A switch for use with a time division multiplexed bus carrying a plurality of data streams of time division multiplexed time slot data, the switch comprising:

a first memory storing a plurality of indications of data storage locations, the indications associated with respective first-memory locations, the first memory configured to output an indication corresponding to a selected first-memory location;

a second memory including a plurality of data storage locations, the second memory coupled to the first memory and configured to select a data storage location, indicated by the indication output by the first memory and received by the second memory, for data transfer between the selected data storage location and the time division multiplexed bus.

5. The switch of claim 4 wherein the first memory includes a plurality of content addressable memories, the first-memory locations store addresses, and the data storage locations store tags.

6. The switch of claim 4 wherein the first memory includes a plurality of content addressable memories and a pipeline memory.

7. The switch of claim 6 wherein the content addressable memories each include first-memory locations that store content addressable memory addresses that are associated with pipeline addresses, and wherein the pipeline memory includes tags associated with the pipeline addresses, the tags being indicative of the data storage locations.

8. The switch of claim 4 further comprising control circuitry configured to select first-memory locations of the first memory and to cause data to be transferred between a time division multiplexed bus and a selected data storage location of the second memory to cause data to be transferred between streams of data of the time division multiplexed bus.

9. The switch of claim 4 wherein the indicia of data storage locations are one of data storage location tags and physical addresses of a pipeline memory that stores data storage location tags at the physical addresses.

10. A telecommunications switching method comprising:

receiving a first indication, associated with a data storage area of a data portion of memory circuitry, by at least one of a plurality of content addressable memories included in the memory circuitry;

transferring time slot data from a time division multiplexed bus to the data storage area in response to the first indication;

receiving a second indication, associated with the data storage area, by at least one of the plurality of content addressable memories included in the memory circuitry; and transferring time slot data from the data storage area to the time division multiplexed bus in response to the second indication.

11. The method of claim 10 wherein time slot data are transferred from a first stream of the bus in response to the first indication and time slot data are transferred to a second stream of the bus in response to the second indication, the first stream being different than the second stream.

12. The method of claim 10 wherein the second indication is received by a content addressable memory that is different from a content addressable memory that receives the first indication.

13. The method of claim 10 wherein the at least one content addressable memory that receives the first indication transfers a tag associated with the first indication to the data portion of the memory circuitry.

14. The method of claim 10 wherein the at least one content addressable memory that receives the first indication transfers a physical address to a pipeline memory portion of the memory circuitry and the pipeline memory portion transfers a tag associated with the first indication to the data portion of the memory circuitry in response to receiving the physical address.

* * * * *